United States Patent
Kim

(10) Patent No.: US 10,005,388 B1
(45) Date of Patent: Jun. 26, 2018

(54) POLITE-SOUNDING VEHICLE HORN APPARATUS

(71) Applicant: Tae Oan Kim, Ulsan (KR)

(72) Inventor: Tae Oan Kim, Ulsan (KR)

( * ) Notice: Subject to any disclaimer, the term of this patent is extended or adjusted under 35 U.S.C. 154(b) by 0 days. days.

(21) Appl. No.: 15/687,778

(22) Filed: Aug. 28, 2017

(30) Foreign Application Priority Data

Feb. 16, 2017 (KR) .................. 20-2017-0000800 U

(51) Int. Cl.
*B60Q 5/00* (2006.01)
*G08G 1/09* (2006.01)
*G08G 1/0967* (2006.01)

(52) U.S. Cl.
CPC ....... *B60Q 5/006* (2013.01); *G08G 1/096725* (2013.01)

(58) Field of Classification Search
CPC ... B60Q 1/12; B60Q 1/08; B60Q 1/04; B60Q 1/442; B60Q 5/005; B60Q 5/006; G06K 9/00791; G02B 27/01; H04N 7/18; G08G 1/096725
See application file for complete search history.

(56) References Cited

U.S. PATENT DOCUMENTS

| | | | | |
|---|---|---|---|---|
| 8,954,252 | B1* | 2/2015 | Urmson | G08G 1/166 180/167 |
| 9,168,867 | B2* | 10/2015 | Tamatsu | B60Q 5/005 |
| 9,194,553 | B2* | 11/2015 | Sheu | F21S 48/1145 |
| 2006/0114125 | A1* | 6/2006 | Kubota | B60Q 1/24 340/905 |
| 2013/0003403 | A1* | 1/2013 | Takahira | B60Q 1/0023 362/538 |
| 2013/0154815 | A1* | 6/2013 | Min | B60Q 1/085 340/425.5 |
| 2014/0062685 | A1* | 3/2014 | Tamatsu | B60Q 5/005 340/425.5 |
| 2014/0240118 | A1* | 8/2014 | Lee | B60Q 5/008 340/463 |
| 2015/0224926 | A1* | 8/2015 | Mochizuki | B60R 1/00 701/36 |
| 2017/0158112 | A1* | 6/2017 | Mouri | B60Q 1/04 |

FOREIGN PATENT DOCUMENTS

KR 10-2016-0021553 A 2/2016

* cited by examiner

*Primary Examiner* — Fekadeselass Girma
(74) *Attorney, Agent, or Firm* — KORUS Patent, LLC; Seong Il Jeong

(57) ABSTRACT

Disclosed herein is a polite-sounding vehicle horn apparatus. The polite-sounding vehicle horn apparatus includes: a main horn sound generator provided in a vehicle, and configured to generate main horn sounds; a subsidiary horn sound generator provided in the vehicle, and configured to generate subsidiary horn sounds lower than the main horn sounds; a main horn button provided on a steering wheel of the vehicle; a subsidiary horn button provided on the steering wheel of the vehicle; a camera sensor configured to detect a shape of a human in front of the vehicle; and an electronic control unit (ECU) configured to generate a main horn sound via the main horn sound generator when the main horn button is pushed, and to generate a subsidiary horn sound lower than the main horn sound via the subsidiary horn sound generator when the subsidiary horn button is pushed.

3 Claims, 5 Drawing Sheets

POLITE-SOUNDING VEHICLE HORN APPARATUS

BACKGROUND

Technical Field

The present invention relates generally to a vehicle horn apparatus, and more specifically to a polite-sounding vehicle horn apparatus which does not give a pedestrian an unpleasant feeling.

Description of the Related Art

Generally, drivers are required to use vehicle horns to call attention to hazards in order to prevent traffic accidents attributable to hazards between vehicles and between a pedestrian and a vehicle.

However, such vehicle horns cause noise pollution and thus give a lot of stress to a pedestrian or the driver of another vehicle, and sometimes cause traffic accidents. In particular, the imprudent use of vehicle horns is a major cause of both urban noise pollution and conflicts between drivers. Since the use of vehicle horns is irregular and unpredictable and is performed regardless of place and time, it is difficult to impose legal sanctions against the imprudent use of vehicle horns.

Accordingly, it is necessary to alert drivers to the imprudent use of vehicle horns. Recently, although the use of vehicle horns has been considered to be a cause of noise pollution, legal sanctions have been imposed on vehicles which generate vehicle horn sounds higher than a prescribed level, and efforts have been made to suppress the imprudent use of vehicle horns through the self-awareness of drivers as much as possible, noise pollution attributable to the use of vehicle horns has not yet been satisfactorily resolved.

As described above, the use of the vehicle horn on a byroad or a well-traveled road gives an unpleasant feeling to a counterpart, and may actually cause an accident.

PRIOR ART DOCUMENT

Patent Document

Patent document 1: Korean Patent Application Publication No. 10-2006-0018956

SUMMARY

An object of the present invention is to provide a polite-sounding vehicle horn apparatus which does not give a pedestrian an unpleasant feeling.

According to an aspect of the present invention, there is provided a polite-sounding vehicle horn apparatus, including: a main horn sound generator provided in a vehicle, and configured to generate main horn sounds; a subsidiary horn sound generator provided in the vehicle, and configured to generate subsidiary horn sounds lower than the main horn sounds; a main horn button provided on a steering wheel of the vehicle; a subsidiary horn button provided on the steering wheel of the vehicle; and an electronic control unit (ECU) configured to generate a main horn sound via the main horn sound generator when the main horn button is pushed, and to generate a subsidiary horn sound lower than the main horn sound via the subsidiary horn sound generator when the subsidiary horn button is pushed.

The polite-sounding vehicle horn apparatus may further include subsidiary horn sound storage memory configured such that a plurality of pieces of different subsidiary horn sound data has been stored therein and a subsidiary horn sound selection button provided on the steering wheel of the vehicle and configured to receive a selection of a type of subsidiary horn sound, and the ECU may generate a subsidiary horn sound selected via the subsidiary horn sound selection button when the subsidiary horn button is pushed.

The type of subsidiary horn sound may be one of a "chirp," a "bang," or "ticktick."

The polite-sounding vehicle horn apparatus may further include a camera sensor configured to detect the shape of a human in front of the vehicle, and the ECU may determine whether to generate the subsidiary horn sound depending on whether the shape of a human has been detected via the camera sensor.

The ECU may generate the subsidiary horn sound even when the subsidiary horn button is not pushed in a case where the shape of a human has been detected via the camera sensor, or may generate the subsidiary horn sound the subsidiary horn sound even when the subsidiary horn button is not pushed only in a case where a gear has been shifted from an N drive position to a D drive position in the state in which the shape of a human has been detected via the camera sensor.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION

The advantages, features, and aspects of the present invention will become apparent from the accompanying drawings and the embodiments described below. However, the present invention is not limited to the embodiments disclosed below, but may be implemented in various different forms. The embodiments are provided merely to fully convey the scope of the present invention to those having ordinary knowledge in the art to which the present invention pertains. The present invention is defined only by the scope of the attached claims. Furthermore, in the following description of the present invention, when it is determined that a detailed description of a related well-known technology or the like may make the gist of the present invention obscure, the detailed description will be omitted.

Figure 1:
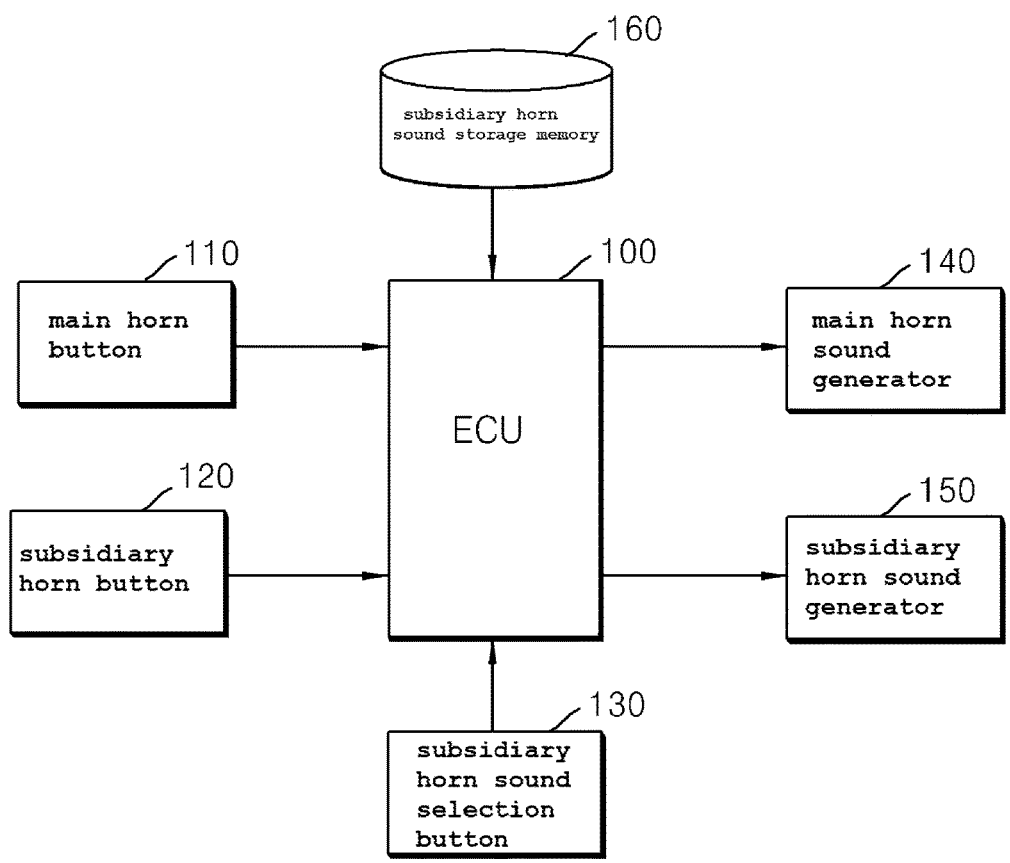
FIG. 1 is a block diagram showing the configuration of a polite-sounding vehicle horn apparatus according to an embodiment of the present invention.
Figure 2:
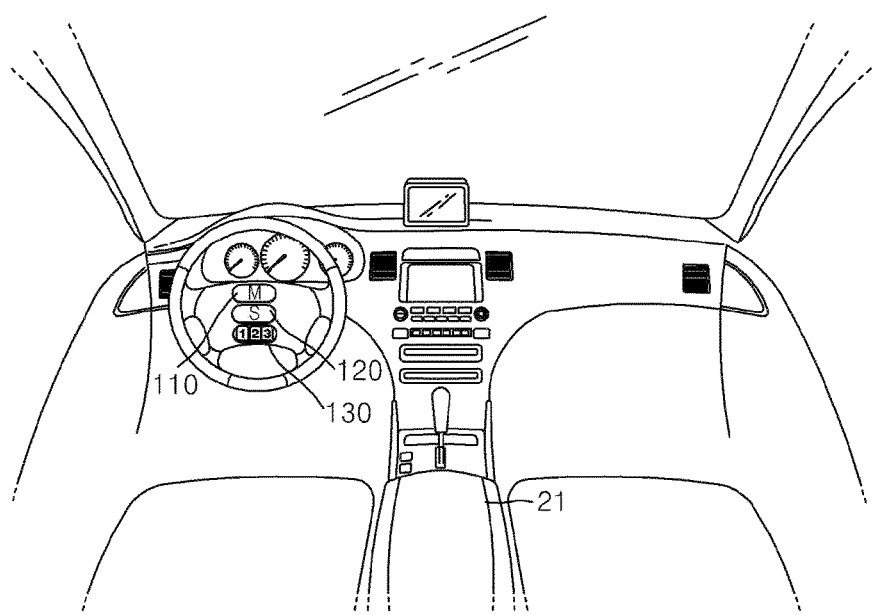
FIG. 2 is a view showing an example in which a main horn button and a subsidiary horn button according to an embodiment of the present invention are provided on the steering wheel of a vehicle.
Figure 3:
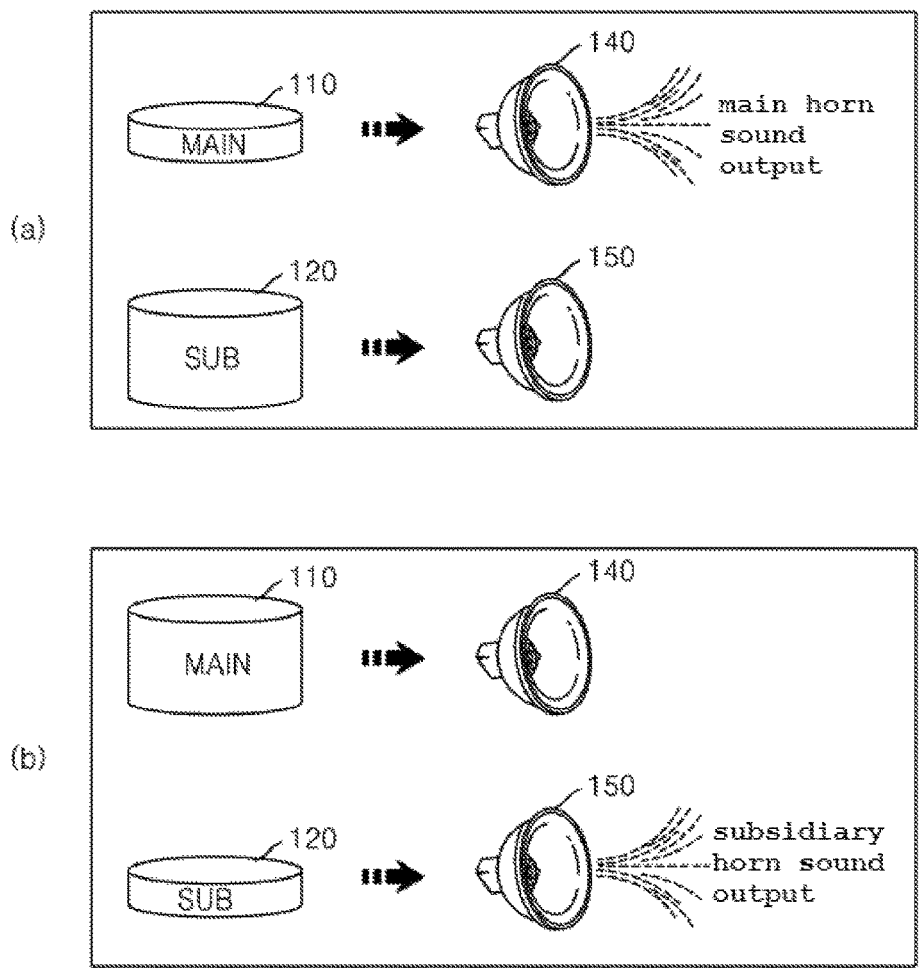
FIG. 3 is a view showing an example in which a main horn sound and a subsidiary horn sound are output according to an embodiment of the present invention.

FIG. 1 is a block diagram showing the configuration of a polite-sounding vehicle horn apparatus according to an embodiment of the present invention, FIG. 2 is a view showing an example in which a main horn button and a subsidiary horn button according to an embodiment of the present invention are provided on the steering wheel of a vehicle, and FIG. 3 is a view showing an example in which a main horn sound and a subsidiary horn sound are output according to an embodiment of the present invention.

The polite-sounding vehicle horn apparatus according to the present invention may be applied to various types of vehicles, such as owner-driven cars, buses, trucks, sports vehicles, etc.

The polite-sounding vehicle horn apparatus according to the present invention may include a main horn sound generator 140, a subsidiary horn sound generator 150, a main horn button 110, a subsidiary horn button 120, and an electronic control unit (ECU) 100. The polite-sounding vehicle horn apparatus may further include subsidiary horn sound storage memory 160, and a subsidiary horn sound selection button 130.

The main horn sound generator 140 is provided in a vehicle, and generates main horn sounds. Generally, the main horn sound generator 140 corresponds to a device which is provided in a conventional vehicle and generates horn sounds. For reference, the main horn sound generator is also referred to as a klaxon, generates sounds by passing compressed air through a vibration plate, and is used to warn surroundings of the presence of the vehicle and a danger.

The subsidiary horn sound generator 150 is provided in a vehicle, and generates subsidiary horn sounds lower than the main horn sounds. The subsidiary horn sound generator 150 is a device which generates horn sounds lower than the main horn sounds. When there is a pedestrian or the like in front of a vehicle, a conventional high main horn sound may frighten the pedestrian. Accordingly, according to the present invention, the separate subsidiary horn sound generator 150 is additionally provided in the vehicle.

The main horn button 110 and the subsidiary horn button 120 are separately provided on the steering wheel of the vehicle, as shown in FIG. 2.

The ECU 100 is a unit for controlling the operation of a vehicle, and performs various types of control, such as the operation of vehicle wipers, the opening and closing of vehicle windows, etc. In particular, the ECU 100 according to the present invention controls the generation of main horn sounds and subsidiary horn sounds. In other words, the ECU 100 generates a main horn sound via the main horn sound generator 140 when the main horn button 110 is pushed, as shown in FIG. 3(a), and generates a subsidiary horn sound lower than the main horn sound via the subsidiary horn sound generator 150 when the subsidiary horn button 120 is pushed, as shown in FIG. 3(b).

Accordingly, while driving the vehicle, a driver generates a higher main horn sound by pushing the main horn button 110 when giving a warning to a neighboring vehicle, and generates a lower subsidiary horn sound by pushing the subsidiary horn button 120 when giving a warning to a pedestrian. This subsidiary horn sound may be one of various types of horn sounds, such as a "chirp," a "bang," "ticktick," etc.

Meanwhile, the subsidiary horn sound may be generated in various forms. A driver may select a desired subsidiary horn sound, and may generate the desired subsidiary horn sound.

For this purpose, the polite-sounding vehicle horn apparatus may further include the subsidiary horn sound storage memory 160 and the subsidiary horn sound selection button 130.

The subsidiary horn sound storage memory 160 is memory configured such that a plurality of pieces of different subsidiary horn sound data has been stored therein. The subsidiary horn sound may include various types of sounds, such as a "chirp," a "bang," "ticktick," etc.

The memory is a module to and from which information can be input and output, such as a hard disk drive, a solid state drive (SSD), flash memory, a compact flash (CF) card, a secure digital (SD) card, a smart media (SM) card, a multimedia card (MMC), or a memory stick. The memory may be provided inside the vehicle, or may be provided in a separate external memory device outside the vehicle. When the subsidiary horn sound storage memory 160 is provided in the separate external memory device, the external memory device is connected to the ECU 100 via a wired/wireless communication method. The wired/wireless communication method may include wired communication methods, such as an Ethernet, a universal serial bus, IEEE 1394, serial communication, and parallel communication, and may also include wireless communication methods, such as infrared radiation, Bluetooth, Home Radio Frequency (HomeRF), and a wireless LAN.

The subsidiary horn sound selection button 130 is provided on the steering wheel of the vehicle, and receives a selection of the type of subsidiary horn sound. For example, the subsidiary horn sound selection button 130 may receive a selection of any one of a "chirp," a "bang," "ticktick," etc. from a driver.

The ECU 100 generates a subsidiary horn sound, selected via the subsidiary horn sound selection button 130, when the subsidiary horn button 120 is pushed.

For example, in the case where a driver has made a setting so that the subsidiary horn sound "chirp" is generated, when the subsidiary horn button 120 is pushed, the sound "chirp" lower than the main horn sound is output as a subsidiary horn sound via the subsidiary horn sound generator 150. In the same manner, in the case where a driver has made a setting so that the subsidiary horn sound "bang" is generated, when the subsidiary horn button 120 is pushed, the sound "bang" lower than the main horn sound is output as a subsidiary horn sound via the subsidiary horn sound generator 150. In the same manner, in the case where a driver has made a setting so that the subsidiary horn sound "ticktick" is generated, when the subsidiary horn button 120 is pushed, the sound "ticktick" lower than the main horn sound is output as a subsidiary horn sound via the subsidiary horn sound generator 150.

Meanwhile, it is preferred that control is performed such that the subsidiary horn sound is automatically output without the operation of the subsidiary horn button 120 by the driver when a human is detected in front of the vehicle. The reason for this is to warn a pedestrian of the approach of the vehicle in such a way that the subsidiary horn sound is automatically generated without the operation of the subsidiary horn button 120 by the driver when the human is detected in front of the vehicle, thereby preventing a deadly accident attributable to the vehicle. The following description will be given in conjunction with FIGS. 4 and 5.

Figure 4:
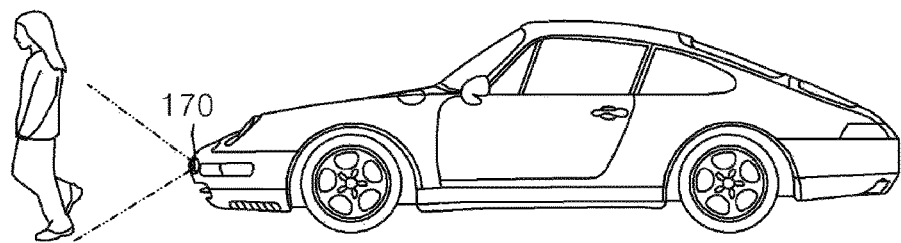
FIG. 4 is a view showing an example in which a human is detected in front of a vehicle according to an embodiment of the present invention.
Figure 5:
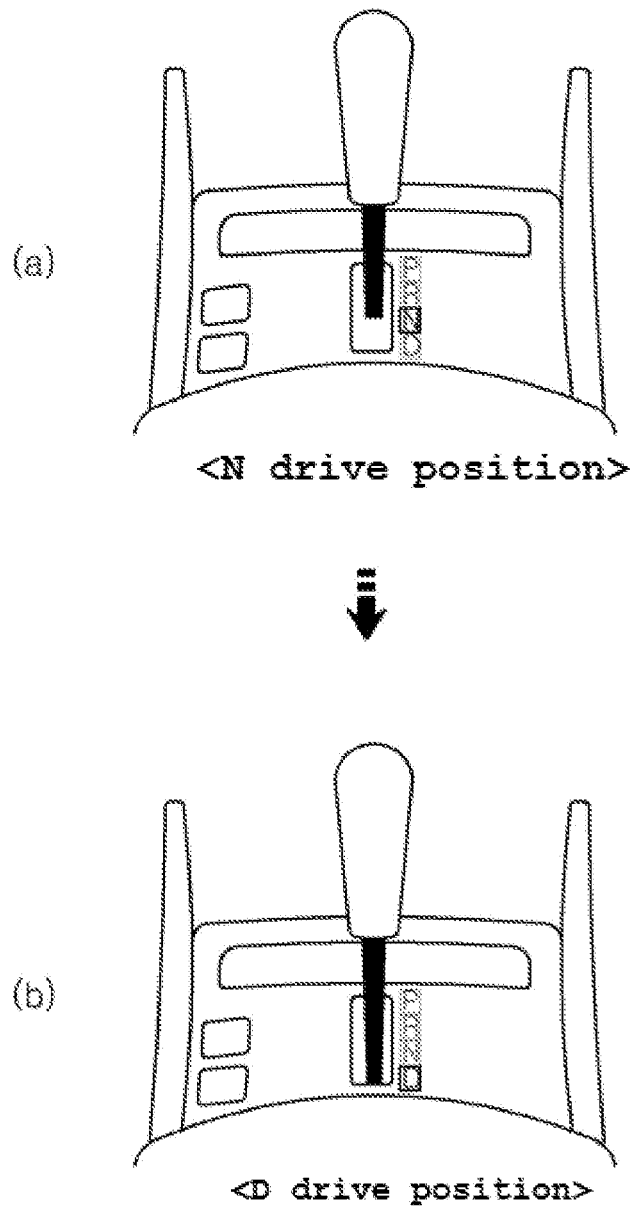
FIG. 5 is a view showing an example in which a gear is shifted according to an embodiment of the present invention.

FIG. 4 is a view showing an example in which a human is detected in front of a vehicle according to an embodiment of the present invention, and FIG. 5 is a view showing an example in which a gear is shifted according to an embodiment of the present invention.

The polite-sounding vehicle horn apparatus further includes a camera sensor 170 configured to detect the shape of a human in front of the vehicle, as shown in FIG. 4. The camera sensor 170 may include a lens assembly, a filter, a photoelectric conversion module, and an analog/digital conversion module. The lens assembly includes a zoom lens, a focus lens, and a compensation lens. The focal distance of the lens may be moved under the control of a focus motor (FM). The filter may include an optical low-pass filter and an infrared cut filter. The optical low-pass filter eliminates the optical noise of a high-frequency component, and the infrared cut filter blocks the infrared component of incident light. The photoelectric conversion module may include a charge coupled device (CCD), a complementary metal-oxide semiconductor (CMOS), or the like. The photoelectric conversion module converts light, emitted from an optics system (OPS), into an electrical analog signal. The analog/digital conversion module may include a correlation double sampler and analog-to-digital converter (CDS-ADC). The analog/digital conversion module (not shown) processes an analog signal from the photoelectric conversion module (OEC), eliminates the high frequency noise thereof, adjusts the amplitude thereof, and converts the analog signal into a digital signal.

Furthermore, a setting may be made such that the camera sensor 170 detects a human only within a preset distance range, for example, within the range of 2 m from the front of the vehicle. The reason for this is that it is not necessary to detect a human far away from the front of the vehicle.

The ECU 100 determines whether to generate a subsidiary horn sound depending on whether the shape of a human has been detected via the camera sensor 170.

The ECU 100 may determine whether to generate a subsidiary horn sound by using the following two methods.

In a first method, when the shape of a human has been detected via the camera sensor 170, the ECU 100 may perform control so that a subsidiary horn sound is generated when the subsidiary horn button 120 is not pushed. When the shape of a human has been detected via the camera sensor 170, a subsidiary horn sound is generated without the operation of the subsidiary horn button 120 by a driver, and notifies the pedestrian of the approach of the vehicle.

In a second method, the ECU 100 generates a subsidiary horn sound even when the subsidiary horn button 120 is not pushed only in the case where a gear has been shifted from an N drive position to a D drive position in the state in which the shape of a human has been detected via the camera sensor 170, as shown in FIG. 5. The condition that a gear has been shifted to a D drive position is added to the condition that the shape of a human has been detected via the camera sensor 170, and a subsidiary horn sound is generated only when the two conditions are fulfilled. In the case where the vehicle is in a parking position P or an N drive position, it is unreasonable to unconditionally generate a subsidiary horn sound when the shape of a human is detected. Accordingly, when the shape of a human is detected in the state in which a gear is in a D drive position, a subsidiary horn sound is allowed to be generated.

The polite-sounding vehicle horn apparatus according to an embodiment of the present invention can notify a counterpart of the presence of vehicle without giving the counterpart an unpleasant feeling by means of the use of a low vehicle horn sound.

Although the present invention has been described with reference to the accompanying drawings and the above-described preferred embodiments, the present invention is not limited thereto, but is defined by the attached claims. Accordingly, those having ordinary knowledge in the art may vary or modify the present invention in various manners without departing from the technical spirit of the attached claims.

What is claimed is:
1. A polite-sounding vehicle horn apparatus, comprising:
   a main horn sound generator provided in a vehicle, and configured to generate main horn sounds;
   a subsidiary horn sound generator provided in the vehicle, and configured to generate subsidiary horn sounds lower than the main horn sounds;
   a main horn button provided on a steering wheel of the vehicle;
   a subsidiary horn button provided on the steering wheel of the vehicle;
   a camera sensor configured to detect a shape of a human in front of the vehicle; and
   an electronic control unit (ECU) configured to generate a main horn sound via the main horn sound generator when the main horn button is pushed, and to generate a subsidiary horn sound lower than the main horn sound via the subsidiary horn sound generator when the subsidiary horn button is pushed;
   wherein the ECU determines whether to generate the subsidiary horn sound depending on whether a shape of a human has been detected via the camera sensor; and
   wherein the ECU generates the subsidiary horn sound even when the subsidiary horn button is not pushed only in a case where a gear has been shifted from an N drive position to a D drive position in a state in which a shape of a human has been detected via the camera sensor.
2. The polite-sounding vehicle horn apparatus of claim 1, further comprising:
   subsidiary horn sound storage memory configured such that a plurality of pieces of different subsidiary horn sound data has been stored therein; and
   a subsidiary horn sound selection button provided on the steering wheel of the vehicle, and configured to receive a selection of a type of subsidiary horn sound;
   wherein the ECU generates a subsidiary horn sound selected via the subsidiary horn sound selection button when the subsidiary horn button is pushed.
3. The polite-sounding vehicle horn apparatus of claim 2, wherein the type of subsidiary horn sound is one of a "chirp," a "bang," or "ticktick".

* * * * *